Patented Dec. 31, 1940

2,227,063

UNITED STATES PATENT OFFICE 2,227,063

COFFEE BEAN FLOUR AND METHOD OF PRODUCING SAME

Robert Brown, New York, N. Y.

No Drawing. Application December 7, 1937,
Serial No. 178,598

14 Claims. (Cl. 99—94)

The present invention relates to the production of an edible bread and particularly a cake or pastry flour from coffee beans, and to the recovery of caffeine as a by-product.

It is a general object of the invention to provide an improved flour suitable for use as such or, preferably, in admixture with grain flours, and particularly cake flours, to which it imparts certain desirable characteristics.

It is also an object of the invention to provide an improved process for the production of an edible flour from coffee beans, which permits of an economical recovery of the major portion of the caffeine from the bean, whereby a substantially de-caffeinated edible flour is obtained, while at the same time a valuable by-product is recovered.

I have found that the residue obtained upon the extraction of coffee beans with, preferably, an aqueous extracting agent furnishes, when ground, a relatively tasteless flour which can be mixed in various proportions with other flours and imparts to the mixture the capacity of absorbing very considerably larger quantities of water than ordinary flours to produce a kneadable mass of the same consistency. The coffee bean flour itself, I have found, is capable of absorbing 6 to 8 times its weight of water before it reaches the kneadable state, as compared with the one-half part of what that is sufficient to bring one part of ordinary flour to a corresponding state, the coffee bean flour of the present invention thus being capable of absorbing 12 to 16 times as much water as cake and other flours now in common use. When the coffee bean flour is mixed with ordinary flours, the water-absorbing capacity is increased to an extent depending upon the proportion of the coffee bean flour. A flour, therefore, composed of or containing the coffee bean flour, will accordingly yield baked or fried breads and pastries of unusual lightness and porosity, and will increase the volume yield per pound of flour. A flour containing the coffee bean flour is characterized also by the capacity to impart to the baked or fried goods an increased degree of crispiness, which is highly desirable with such products as doughnuts and the like. Also, by previously roasting the flour to any desired degree, a coffee flavor can be imparted to the product, the coffee bean flour in the unroasted condition being practically tasteless. A certain degree of roasting will, however, occur on baking or frying at approximately the usual coffee roasting temperatures.

A preferred procedure for producing the flour hereinabove described is the following:

The green coffee beans, before or after comminution, preferably after, are mixed with water at a temperature of about 150° F., about 7 or 8 parts by weight of water being employed for each part by weight of the beans. There is slowly added to the mixture, in the form of a strong or concentrated solution, such a quantity of sea salt that it comprises about 1 to 5% by weight of the dry beans. The beans are stirred in the solution for about ten minutes and then left standing for about half an hour, whereupon the mixture is again stirred for about ten minutes and left standing for about twenty minutes. The hot water is then syphoned off, or removed in any other way, and a similar proportion (7 or 8 parts) of cold water is then added to the beans, and the mixture allowed to stand for about half an hour, during which period the beans become cooled. The cold water is then removed and 7 or 8 parts of hot water (about 150° F., or somewhat lower) are again mixed with the beans for about ten minutes, allowed to stand for half an hour, again stirred, and then allowed to settle.

This alternate treatment with hot and cold water may be repeated three or four times. I have found that this alternate treatment effects removal of the greater part of the caffeine and at the same time removes also the bitter and raw taste of the beans, leaving a product which is practically tasteless and thus can be blended with other baking materials without affecting the taste of the product.

After the extraction, the bean residue is ground to more or less the colloidal or impalpable condition in a colloid, stone, ball or other mill, after which the paste which may contain from 4 to 5 parts of added water to each part (by weight) of beans, is dried in any suitable manner, as by spray drying, or under vacuum, preferably below 212° F.

In place of the sea salt, other more or less neutral salts can be employed, such as ordinary table salt, calcium chloride, sodium sulphate, etc. The use of a salt, however, is not absolutely necessary. The salt should not be alkaline in character, as proteins would then be extracted from the beans. As even neutral salts may cause solution of certain of the bean proteins, it is desirable to keep the concentration relatively low, preferably below 5% of the weight of the beans. The use of a salt during the extraction, however, is desirable as it aids in extracting the caffeine and in removing the substances which impart a bitter taste to the beans. It is sufficient to employ the salt only during the first aqueous extraction, although, of course, it may be used in one or more of the subsequent extractions. A satisfactory product is, however, obtained without the use of a salt.

To recover the caffeine from the aqueous extracts, the latter are made slightly alkaline and are then shaken with chloroform, benzene or other organic solvent for caffeine. As the caffeine is much more soluble in the organic solvent than in water, most of it is extracted by the organic solvent, and upon evaporation of the latter, crystals of caffeine are obtained, the yield amounting to about 1% of the weight of the beans. The residual water is re-used for the extraction of further quantities of raw beans, and the extracting process conducted continuously in this fashion until the water becomes saturated with other substances to such an extent that the extraction of the caffeine is interfered with, whereupon it is discarded and fresh batches of water are then introduced. By the re-use of the water after elimination of the caffeine, I reduce the extraction from the beans of certain soluble and desirable components, such as water-soluble proteins; for after the first run, substantially no water-soluble proteins are extracted by the water and they remain in the product. As a result, only a very small proportion of the proteins is removed from the beans, at the most only a few per cent.

The ground, de-caffeinated product is of a light grayish-white to white color and is non-hygroscopic. As indicated above, the product may be roasted after the extraction treatment; such roasting will, however, reduce somewhat the water-absorbing capacity of the flour, but on the other hand, will give the product a coffee flavor, without the bitterness frequently associated with coffee.

The product obtained by the process herein described differs from ordinary grain flour in being more nutritious, containing about 13% of nitrogen, and having a lower starch content. As already pointed out, it is far more water-absorbing, and it has also strong raising power. When used in the proportion of 7 to 10% of a flour, it causes increase in the volume yield of about 20%, while at the same time the product is more crisp, as the coffee flour dries brittle and hard, and in the case of doughnuts and other fried pastries, the amount of grease absorbed is reduced. I have found further that a batter containing my flour will keep longer than ordinary flour under the same conditions. Doughnuts made with a flour containing from about 7½ to 15% of the above described coffee bean flour is thus lighter, crispier, and practically non-greasy as compared with doughnuts prepared with known flours, the lightness being due to the fact that, when, for example, only 7½% of the coffee bean flour is employed, about 30% more water can be employed to make up the batter.

My improved flour is particularly suitable for use as a diabetic flour, since it is highly absorbent, which permits the use of, for example, a larger quantity of milk, and thereby the starch content is reduced.

It will be noted that the caffeine, as above described, is extracted with the aid of an aqueous extracting agent, the agent being either pure water or water containing a dissolved salt. This water extraction has the advantage over extracting with organic agents, many of which are definitely poisonous, that no special measures need be provided for the complete removal of the solvent, or for removing any taste or odor of the solvent. The extracting is preferably done at temperatures considerably below the boiling point in order to avoid the insolubilization of any heat-coagulable proteins that may be present in the beans. In this way, retention of the high water-absorbability of the bean flour is insured.

Cakes and pastries made with a flour containing only about 7 to 15% of coffee bean flour prepared as hereinabove described, has been found to have a buttery taste that is desirable. This is probably due to the tannic acid and the oils contained in the bean flour which combine during the baking with the milk solids present in cake and pastry flour, and produce combinations possessing the buttery flavor. It is for this reason, among others, that I prefer not to roast the coffee bean flour, at least not completely, before mixing with the grain flour, such as the cake or pastry flour, as such previous roasting tends to reduce the capacity of the flour for producing the taste-giving combinations with the ingredients of the latter flour.

I claim:

1. A method of preparing a bread or cake flour characterized by a high water-absorbing capacity, which comprises subjecting raw coffee beans to extraction with a solvent to remove at least part of the caffeine at a temperature of about 150° F., removing the extract, extracting the beans with cold water, grinding the solid residue to the impalpable condition without previous roasting, and mixing the same with a greater proportion of a grain flour.

2. A method of preparing a bread or cake flour which comprises subjecting raw coffee beans to extraction with hot and cold water alternatingly, to remove at least part of the caffeine, grinding the residual solid matter to the impalpable condition without previous roasting, and mixing the same with a greater proportion of a grain flour.

3. A method of producing a bread or cake flour having a relatively high water-absorbing capacity, which comprises subjecting raw coffee beans to extraction with an aqueous extracting agent to remove at least part of the caffeine, grinding the so de-caffeinated residue, and mixing the same with a larger proportion of cake flour.

4. In a method of preparing an edible bread or cake flour characterized by a high water-absorbing capacity, the steps which comprise comminuting raw coffee beans, subjecting the comminuted material to an aqueous extracting agent, and finally drying the so de-caffeinated residue and mixing the same with a grain flour in such proportion that the coffee bean flour comprises up to about 15% of the total flour.

5. In a method of preparing an edible bread or cake flour characterized by a high water-absorbing capacity, the steps which comprise comminuting unroasted coffee beans, subjecting the comminuted material to an aqueous extracting agent to remove at least part of the caffeine, roasting the residue, grinding the same, and mixing the so de-caffeinated and ground roasted beans with a larger proportion of a grain flour.

6. A cake flour containing a major proportion of a grain flour and a minor proportion of a ground, de-caffeinated residue of coffee beans.

7. A cake flour containing a major proportion of a grain flour and a minor proportion of a roasted, de-caffeinated residue of raw coffee beans.

8. A cake flour comprising a major proportion of a grain flour and a minor proportion of a mixture of cake flour and a ground, decaffeinated residue of green coffee beans.

9. A cake flour containing a major proportion of a grain flour and approximately 5 to 15% of a ground, de-caffeinated coffee bean.

10. A cake flour comprising a mixture of a major proportion of a cake flour and a minor proportion of ground, water-extracted green coffee beans.

11. A doughnut flour containing about 92½% of a grain flour mixture and approximately 7½% of ground, de-caffeinated coffee beans and capable of absorbing approximately 30% more of water than the grain flour mixture to the same kneading consistency.

12. A bread and cake flour characterized by an increased water-absorbing capacity over grain flour and comprising a mixture of a major proportion of a substantially white grain flour and a minor proportion of an at least partially de-caffeinated, finely ground coffee bean flour.

13. A bread and cake flour characterized by an increased water-absorbing capacity over grain flour and comprising a mixture of a substantially white grain flour and up to about 15% of a finely ground, unroasted coffee bean flour.

14. A method of producing a bread or cake flour characterized by a high water-absorbing capacity, which comprises subjecting raw coffee beans to extraction with water at a temperature of about 150° F., to remove at least part of the caffeine, grinding the solid residual matter in the moist condition, drying the product, and subsequently mixing the same with a grain flour.

ROBERT BROWN.